No. 837,756. PATENTED DEC. 4, 1906.
J. R. THOMAS.
FEEDING ROLL.
APPLICATION FILED JULY 19, 1906.
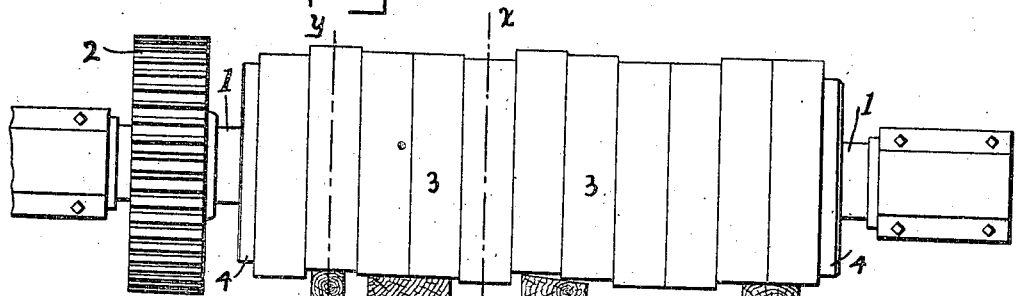
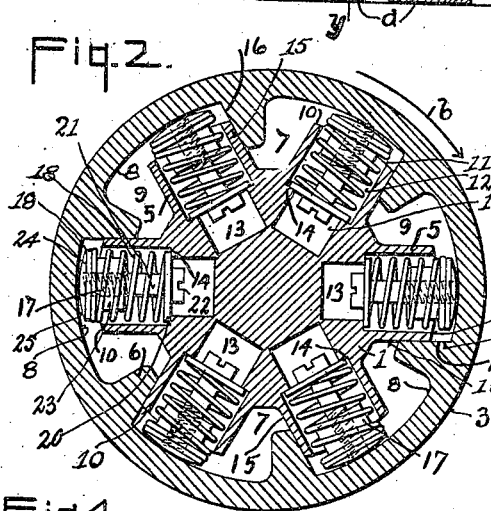
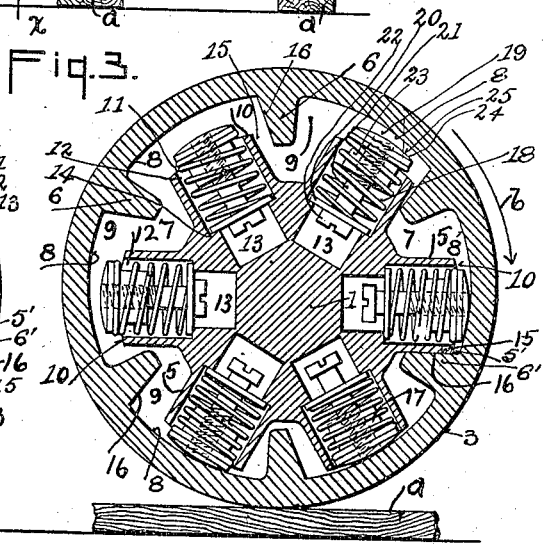
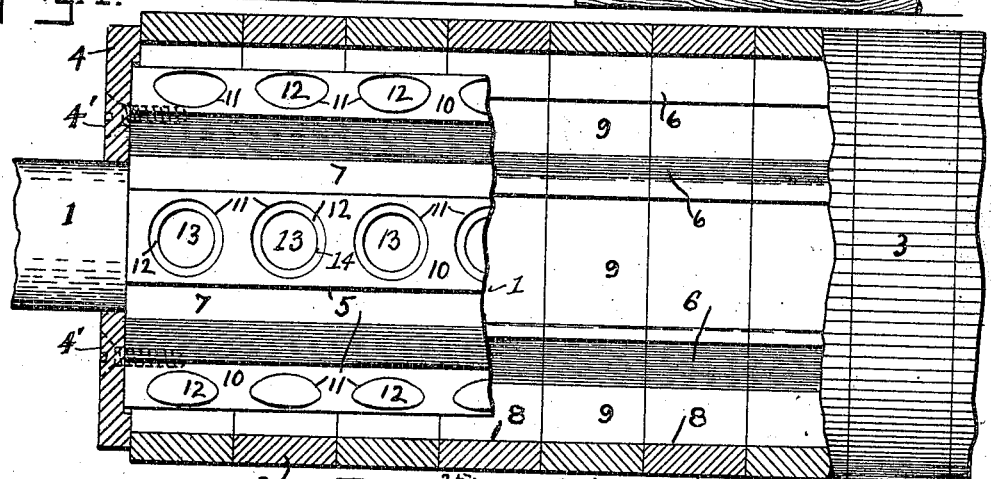
Witnesses
Homer Bradford
Cordelia O'Harn
Inventor
John R. Thomas,
by B. F. Herbsleb
His Attorney

UNITED STATES PATENT OFFICE.

JOHN R. THOMAS, OF CINCINNATI, OHIO, ASSIGNOR TO J. A. FAY & EGAN COMPANY, OF CINCINNATI, OHIO, A CORPORATION OF WEST VIRGINIA.

FEEDING-ROLL.

No. 837,756.   Specification of Letters Patent.   Patented Dec. 4, 1906.

Application filed July 19, 1906. Serial No. 326,946.

*To all whom it may concern:*

Be it known that I, JOHN R. THOMAS, a citizen of the United States, residing at Cincinnati, in the county of Hamilton and State of Ohio, have invented certain new and useful Improvements in Feeding-Rolls, of which the following is a specification.

My invention relates to feeding-rolls of the character employed in woodworking machinery, particularly in wood-planing machinery, and has for its object the providing of a feed-roll comprising outer feeding-sections and novel instrumentalities whereby the said outer feeding-sections are caused to rotate and are permitted to yield relatively to each other, so that strips of different thicknesses may be fed side by side through the machine and the feeding force of the feeding-roll applied to said strips of different thicknesses; and the invention will be readily understood from the following description and claims, and from the drawings, in which—

Figure 1 represents a front elevation of my improved device, showing sections thereof yielding to different extent for accommodating strips of different thicknesses. Fig. 2 is a cross-section of the same on the line x x of Fig. 1, showing the shaft and an outer feeding-section in concentric relation. Fig. 3 is a cross-section of the same on the line y y of Fig. 1, showing an outer feeding-section raised by a strip being fed through the machine and in eccentric relation to the shaft. Fig. 4 is an enlarged detail of my improved device, showing the same partly in front elevation and partly with the outer feeding-sections in central vertical longitudinal section, with the shaft partly broken away and the spring units omitted; and Fig. 5 is a side elevation of the spring unit.

1 represents a shaft which I shall term a "central" or "driving" shaft and is adapted to be driven in any ordinary manner—for instance, by a gear 2—and is arranged to be journaled in the machine in any ordinary or well-known manner, the manner of mounting and driving the same not being more particularly shown, because well-known. Outer roll-sections are shown at 3. These roll-sections are adapted to make contact with the stock a, shown in the form of strips for feeding the same through the machine, the sections forming the feeding-shell of the roll. Flanges 4 may be releasably secured to the shaft, as by screws 4', at the respective ends of the series of roll-sections.

The shaft is provided with outwardly-extending ribs 5 and the outer roll-sections with inwardly-extending ribs 6, the latter taking into the grooves 7 between the outwardly-extending ribs of the shaft. The ribs 6 project inwardly from the inner face 8 of the outer roll-sections and form grooves 9 at the inner side of said roll-sections. At the outer ends 10 of the ribs 5 the shaft has a diameter which is smaller than the diameter of the outer roll-sections between the inner faces 8 of the latter for permitting the outer roll-sections to have play on the shaft transversely of the longitudinal axis of the latter. The grooves 7 9 and the ribs 5 6 preferably normally extend substantially radially of the shaft.

The shaft is provided with pockets 11, which are shown as extending radially thereof and as located in the ribs 5. These pockets respectively comprise an outer bore 12 of larger diameter and an inner bore 13 of smaller diameter, forming a shoulder 14 between said bores. The ribs 5 6 are respectively provided with contacting or engaging faces 15 16, normally in engagement with each other, and for normally causing this engagement and positioning the sections concentrically with relation to the shaft I provide pressure agencies in the pockets adapted to normally position the parts in correct relation. I provide these pressure agencies in the form of spring units 17, comprising a spring 18, a plug 19 at one end of the spring, a washer 20 at the other end of the spring, and a bolt 21, the head 22 of the bolt taking against the washer, while the threaded end of the bolt-screws into the plug, the parts forming a unit which is readily received by any of the pockets 11 and is readily removed or replaced. Before inserting the unit into its pockets the bolt is screwed into the plug to the desired extent, so that the spring unit will have its proper limit of extension. The outer end of the bolt is then preferably riveted to the plug, as shown at 21', for preventing change of tension of the spring after the spring unit is in the roll. The plug has a shank 23 and a head 24, which latter has a slightly-rounded outer face 25, the rounding of said outer face being greater than the rounding of the inner face 8 of the outer roll-section 3 for permitting relative rocking of said outer face 25 upon the inner face 8. When the spring unit is received by a pocket, the washer 20 rests upon the shoulder 14 thereof, the inner bore 13 receiving the bolt-head 22 and permitting said head to be pushed inwardly when the spring is compressed.

In operation the engaging faces 15 of the ribs 5 of the shaft make contact with the contact-faces 16 of the ribs 6 of the roll-sections for rotating the latter with the shaft. The normal position of these roll-sections is concentric with relation to the shaft. When, however, a piece of stock is fed under any given roll-section so as to cause the latter to yield, the stock-engaged face of the roll-section will approach nearer the rotary axis of the shaft and the roll-section will also slightly shift its rotary position about the shaft. Thus, referring to Fig. 3, when the stock a makes contact with a roll-section 3 with sufficient force the said roll-section will be raised to an eccentric position with relation to the shaft against the pressure of the lower springs. The direction of rotation of the parts is indicated by the arrow b. In Fig. 3 the roll-secton is shown as yielding to fullest extent, it being understood that still further yield of the roll is accomplished by the entire roll-shaft yielding against a yielding pressure suitably applied in any ordinary and well-known manner upon the roll-shaft bearings.

When the roll-section 3 yields relatively to its shaft, the feeding force of the shaft is transmitted to the roll-section through the ribs located substantially parallel with the face of the stock at that side of the roll which is being fed downwardly or toward the stock, (indicated as the ribs 5' 6'.) It will be understood that the position of these ribs is continually changing in their rotation and that this feeding force is successively taken up by the successively-following ribs. In practice the springs may be permitted sufficient extension for forcing the plugs continuously against the inner face of the roll-section; but I prefer to compress the said springs in their units sufficiently to permit the plugs of said units to extend radially to only such distance as to cause them to make substantial contact with the inner faces of the outer roll-sections when the latter are in concentric position with relation to the shaft, so that when a roll-section is raised by a piece of stock the lower spring units will be compressed, while the upper spring units will ride free, so as not to counteract the pressing action of the lower spring units.

It will be noticed that the ribs and grooves of the shaft and roll-sections extend longitudinally of the same, and in assembling the parts the spring units may be readily placed in the pockets and the roll-sections slipped endwise over the same and longitudinally of the shaft, especially as the spring units are limited in their extension to have their outer ends extend radially only substantially to the inner face of the outer roll-sections when the latter are in concentric position. By the release of either of the flanges 4 these roll-sections may be slipped longitudinally across each other's normal positions for ready access to any defective spring unit without dismantling any parts it is desired not to disturb.

Having thus fully described my invention, what I claim as new, and desire to secure by Letters Patent, is—

1. In a feed-roll, the combination of an outer roll member and an inner roll member, driving means between said roll members one of said members having pockets respectively comprising a plurality of bores having a shoulder therebetween, a spring in the bore of larger diameter in each of said pockets whose expansion is limited at one end by the shoulder in said pocket, a plug for the other end of said spring for receiving the force of compression applied to said spring, and a shank extending from said plug and received by the smaller of said bores.

2. In a feed-roll, the combination of an outer roll member, an inner roll member, driving means between said roll members, springs between said roll members compressible radially thereof, and means interiorly connecting the ends of said springs limiting extension of said springs.

3. In a feed-roll, the combination of an outer roll member, an inner roll member, driving means between said roll members, and a series of spring units between said roll members arranged about the axis thereof, said spring units respectively comprising means for limiting extension of the springs thereof, constructed and arranged for compressing certain of said spring units and relieving contact of others of said spring units between said roll members on movement of one of said roll members transversely of the axis of the other of said roll members.

4. In a feed-roll, the combination of an outer member and an inner member, driving means between said members and spring units between said members comprising a spring, a limiting member at each end of said spring, and a connecting member between said limiting members.

5. A feed-roll comprising an outer roll member and an inner roll member having engaging ribs, one of said members having radial pockets, and spring units in said pockets exerting pressure outwardly against said outer roll member, said spring units respectively comprising a spring and connected and relatively movable limiting members at the ends of said spring.

6. In a feed-roll, the combination of an outer driven member and an inner driving member having driving means therebetween, and spring units between said members comprising a spring, a limiting member at each end of said spring and a connecting-shank between said limiting members.

7. In a feed-roll, the combination of an outer driven member and an inner driving member having driving means therebetween, and spring units between said members comprising a spring, an abutting member at each end of said spring and an adjustable shank between said abutting members.

8. In a feed-roll, the combination of an outer stock-engaging member and an inner driving member, said members having engaging ribs for driving the former from the latter, said driving member having pockets respectively comprising a plurality of bores having a shoulder therebetween, springs in said pockets whose inward movements are limited by said shoulders, shanks for said springs respectively received by the smaller of said bores, and plugs at the outer ends of said shanks shiftable with said springs relatively to the peripheral face of said stock-engaging member.

9. In a feed-roll, the combination of an outer stock-engaging member and an inner driving member therefor, the said driving member having pockets with an outer bore of larger diameter and an inner bore of smaller diameter, spring units received by said pockets respectively, said spring units respectively comprising a spring whose inner movement is limited by said shoulder, a shank in said spring having reciprocation in said smaller bore and a limiting member at each end of said spring connected by said shank.

10. In combination, in a feed-roll, an outer stock-engaging member, an inner driving member therefor, said inner driving member having pockets respectively comprising an outer bore of larger diameter and an inner bore of smaller diameter, forming a shoulder therebetween, and spring units received by said pockets respectively, said spring units respectively comprising a spring, a washer at one end of said spring, a plug at the other end of said spring, and a connecting member between said washer and plug, said washer being positioned by said shoulder and said connecting member having reciprocation in said smaller bore.

11. In combination, in a feed-roll, a stock-engaging member having inwardly-projecting ribs, a driving member having outwardly-extending ribs engaging said first-named ribs, said driving member having pockets, and spring units received by said pockets, said spring units comprising a spring, a limiting member at each end of said spring, and a connecting-shank between said limiting members, said shank having reciprocation in its pocket, substantially as described.

12. In a sectional feed-roll for woodworking machinery, the combination of outer stock-engaging sections having inwardly-extending ribs, a driving member having outwardly-extending ribs adapted to engage said first-named ribs, said driving member having pockets respectively comprising an outer bore of larger diameter and an inner bore of smaller diameter forming a shoulder therebetween, and spring units for said respective pockets, said spring units comprising a spring, a plug at the outer end thereof, a washer at the inner end thereof, a bolt having a head secured to said plug and reciprocating in said washer, the said washer being seated on said shoulder and the head of said bolt reciprocating in said bore of smaller diameter, substantially as described.

In testimony whereof I have subscribed my name hereto in the presence of two subscribing witnesses.

JOHN R. THOMAS.

Witnesses:
   PETER A. SOLEM,
   WILLIAM B. GRIESE.